United States Patent
Kim (10) Patent No.: US 7,353,403 B2
(45) Date of Patent: Apr. 1, 2008

(54) COMPUTER SYSTEMS SUCH AS SMART CARDS HAVING MEMORY ARCHITECTURES THAT CAN PROTECT SECURITY INFORMATION, AND METHODS OF USING SAME

(75) Inventor: Sung-Hyun Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 852 days.

(21) Appl. No.: 10/424,654

(22) Filed: Apr. 28, 2003

(65) Prior Publication Data

US 2003/0233565 A1 Dec. 18, 2003

(30) Foreign Application Priority Data

May 29, 2002 (KR) ...................... 10-2002-0029877

(51) Int. Cl.
*G06F 9/00* (2006.01)
(52) U.S. Cl. .......................... 713/193; 713/172; 726/9; 726/20
(58) Field of Classification Search ................ 713/193, 713/172; 726/9, 20
See application file for complete search history.

(56) References Cited

U.S. PATENT DOCUMENTS

| | | | |
|---|---|---|---|
| 5,081,675 A | 1/1992 | Kittirutsunetorn | |
| 5,610,981 A | 3/1997 | Mooney et al. | |
| 6,220,510 B1* | 4/2001 | Everett et al. | ............... 235/380 |
| 6,259,124 B1 | 7/2001 | Guidash | |
| 6,292,874 B1 | 9/2001 | Barnett | |
| 6,487,649 B1 | 11/2002 | Sedlak et al. | |
| 6,609,199 B1* | 8/2003 | DeTreville | ................... 713/172 |
| 6,925,569 B2* | 8/2005 | Wuidart | ...................... 713/193 |

FOREIGN PATENT DOCUMENTS

WO  WO 01/29672 A1  4/2001

* cited by examiner

*Primary Examiner*—Ellen Tran
(74) *Attorney, Agent, or Firm*—Myers Bigel Sibley & Sajovec, PA (57) ABSTRACT

A computer system such as a smart card includes first, second and third memory areas. The first memory area may be a general code area, and stores therein at least one general application program including at least one subroutine call to the second memory area. The second memory area may be a vector table area, and stores therein at least one subroutine call to the third memory area. The third memory area may be a security code area, and stores therein at least one security application program that is only callable by a subroutine call from the second memory area. A processing system is configured to execute a general application program in the first memory area, including a subroutine call to the second memory area, and to unlock the third memory area only upon executing a subroutine call from the first memory area to the second memory area.

29 Claims, 4 Drawing Sheets

Fig. 1

- 7 (Data Memory)
  - 9 General Data Area
  - 8 Security Data Area
- 3 (Program Memory)
  - 6 General Code Area
  - 5 Vector Table Area
  - 4 Security Code Area
  - CS
- 15 Encryption-Dedicated Processor
- 1 I/O Terminal
- 2 CPU
- 13
- 10 (Security Program Activation Unit)
  - 12 Latch Logic (SET / RESET)
  - 11 Address Decoder Logic

COMPUTER SYSTEMS SUCH AS SMART CARDS HAVING MEMORY ARCHITECTURES THAT CAN PROTECT SECURITY INFORMATION, AND METHODS OF USING SAME

RELATED APPLICATION

This application claims the benefit of Korean Patent Application No. 2002-0029877, filed May 29, 2002, the disclosure of which is hereby incorporated herein by reference in its entirety as if set forth fully herein.

FIELD OF THE INVENTION

This invention relates to computer systems, memory architectures for computer systems and methods of operating the same, and more particularly to computer systems including security information and memory architectures and operational methods therefor.

BACKGROUND OF THE INVENTION

Security applications are widely used with computer systems. These security applications may be used to validate authorized users and/or to encrypt and decrypt sensitive information.

Security may be especially important for smart cards. As is well known to those having skill in the art, a smart card is a computer system on an electronic card that is generally of the same size and quality of material as a credit card. An Integrated Circuit (IC) chip is contained in the smart card. The IC chip generally contains a Central Processing Unit (CPU) which may be a microprocessor, a Chip Operating System (COS) and memory, such as Electrically Erasable and Programmable Read Only Memory (EEPROM) and/or Read Only Memory (ROM). Thus, a smart card can store and process information therein.

Because the processor and memory are contained on the smart card, smart cards may be particularly amenable to obtaining high reliability and/or security and can, therefore, function as an electronic purse. Smart cards have been used in various fields, such as financial systems, distributed processing and information security, factory automation, office automation, medical treatment, government programs (e.g., Social Security), mobile communications, public telephones, cable TV, power, gas, other utilities, education, credit card, cash card, prepaid card, home banking, etc. A smart card may be used for a single application or service, or multiple applications or services may be integrated in one smart card.

Reading/writing/erasing operations of data stored in the smart card and communication between the smart card and external devices may be rigidly controlled and protected through the physical security of the smart card itself and/or by using cryptography. However, many techniques have also been developed to circumvent these security procedures. In particular, hacking techniques have been developed to try to directly access security information on the smart card by bypassing the complex encryption firewall of the smart card, for example by using a subroutine call, also referred to herein as a "jump command", during execution of an operating system on the smart card. Thus, during the operating system program execution, the security information may be obtained or changed during a jump to the security program and/or to a load/save command.

SUMMARY OF THE INVENTION

Some embodiments of the invention provide computer systems that include first, second and third memory areas wherein the first memory area stores therein at least one general application program including a plurality of subroutine calls to the second memory area. The second memory area stores therein at least one subroutine call to the third memory area. The third memory area stores therein at least one security application program that is callable by a subroutine call from the second memory area. Processing means, such as a processing system, is configured to execute a general application program in the first memory area, including a subroutine call to the second memory area, and to unlock the third memory area only upon executing a subroutine call from the first memory area to the second memory area. In other embodiments, these processing systems are further configured to prevent unlocking the third memory, area while executing a general application program in the first memory area.

In still other embodiments, a processing system includes an address bus that transmits an address of a memory location that is being accessed, and is configured to unlock the third memory area when the address bus transmits an address of a memory location in the second memory area, and to lock the third memory area when the address bus transmits an address of a memory location in the first memory area. Other embodiments include a fourth memory area that stores therein data that is processed by the at least one general application program in the first, memory area, and a fifth memory area that stores therein data that is processed by the at least one security application program in the third memory area. A processing system is further configured to unlock the fifth memory area only upon executing the subroutine call from the first memory area to the second memory area. Moreover, the processing system is further configured to prevent unlocking of the fifth memory area while executing a general application program in the first memory area.

In other embodiments of the present invention, these processing systems include address decoder logic that is configured to produce a set signal in response to an address that is transmitted on the address bus being located in the second memory area, and a latch that is responsive to the set signal, to activate a select signal for the third memory area. The address decoder logic may be further configured to produce a reset signal in response to an address that is transmitted on the address bus being located in the first memory area, the latch being responsive to the reset signal to deactivate the select signal for the third memory area.

In still other embodiments, the first, second and third memory areas and the processing system are all contained in the smart card. In other embodiments, the processing system is further configured to maintain the third memory area unlocked while executing a security application program in the third memory area and to lock the third memory area on executing a subroutine call from the third memory area to the first memory area. In still other embodiments of the present invention, the most significant address bit of the first memory area and the third memory area are complementary to one another. The most significant address bit on the address bus is applied to the third memory area and is applied to the first memory area in inverted form. Thus, in these embodiments, the third memory area is activated by a combination of the select signal and the most significant bit of the address bus.

Other embodiments of the present invention provide a memory architecture for a computer system. The memory architecture comprises first, second and third memory areas as were described above. A fourth and a fifth memory area also may be provided as was described above. A most significant address bit of the first memory area and the third memory area may be complementary to one another as was described above.

Methods of executing a security program while executing an application program also may be provided according to other embodiments of the present invention. In these methods, an application program is executed. The security program is unlocked only upon execution of a subroutine call to a vector table area that only contains therein at least one subroutine calls to the security program. The security program that is unlocked is then executed. In other embodiments, the security program is locked upon executing a subroutine call back to the application program. The security program may be maintained unlocked while executing the security program. These operations all may be performed in a smart card.

BRIEF DESCRIPTION OF THE DRAWINGS

FIG. 1 is a block diagram of a computer system such as a smart card in accordance with embodiments of the present invention.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

The present invention is described below with reference to block diagrams and/or other illustrations of methods, apparatus (systems) and/or computer program products according to embodiments of the invention. It is understood that each block of the block diagrams and/or other illustrations, and combinations of blocks in the block diagrams and/or other illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or other block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or other block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or other block or blocks.

It should also be noted that in some alternate implementations, the functions/acts noted in the blocks may occur out of the order noted in the drawings. For example, two blocks or operations shown in succession may in fact be executed substantially concurrently or the blocks or operations may sometimes be executed in the reverse order, depending upon the functionality/acts involved.

Figure 3:
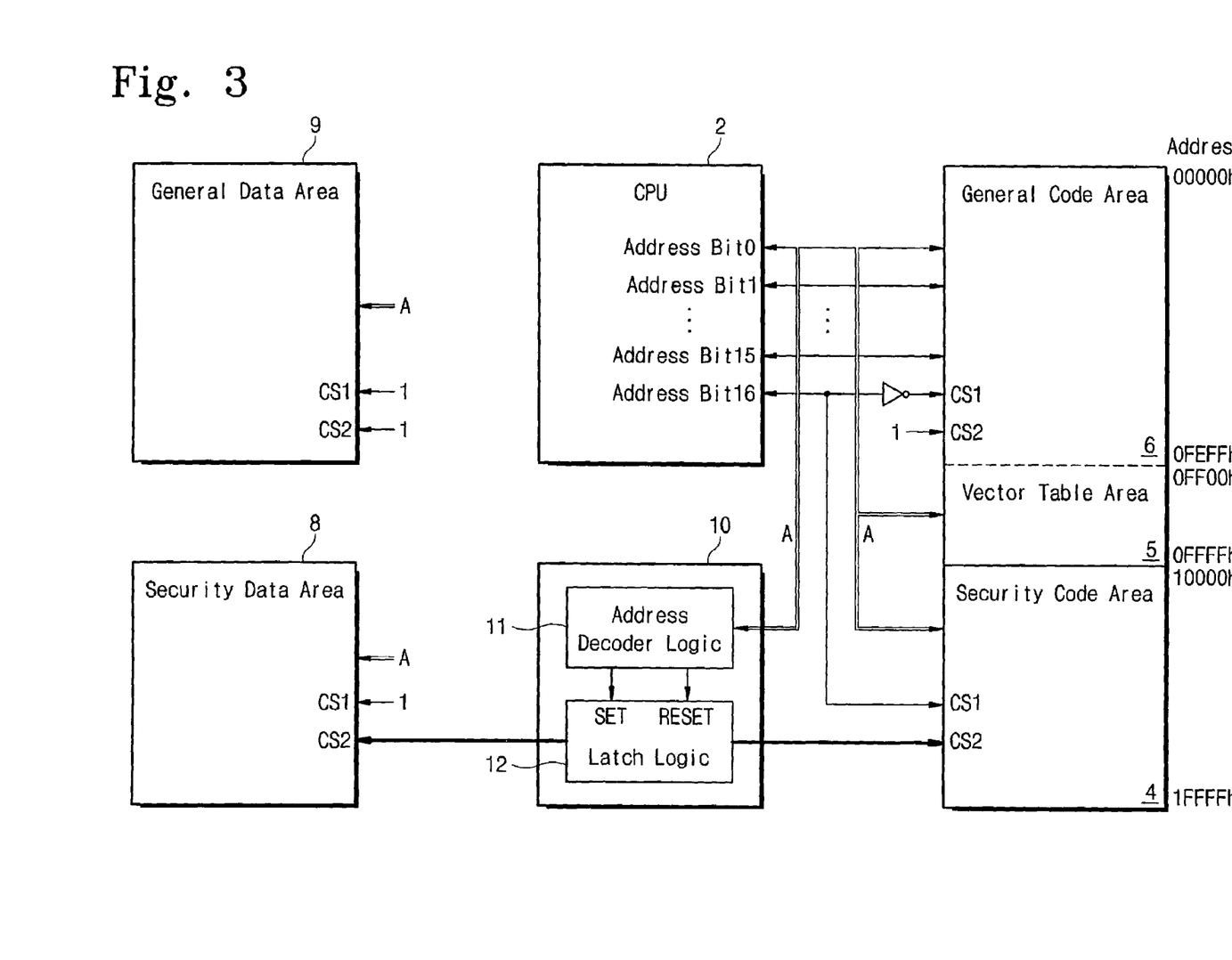
FIG. 3 is a block diagram of a computer system such as a smart card in accordance with other embodiments of the present invention.

FIGS. 1 and 3 are block diagrams of computer systems according to embodiments of the present invention. These computer systems may be embodied in enterprise, application, personal and/or pervasive computer systems that are well known to those having skill in the art. However, it will be understood that embodiments of the present invention may be particularly useful with smart cards, due to their use as an electronic purse or electronic identification. Accordingly, embodiments of FIGS. 1 and 3 will be described below with reference to smart cards.

Figure 2:
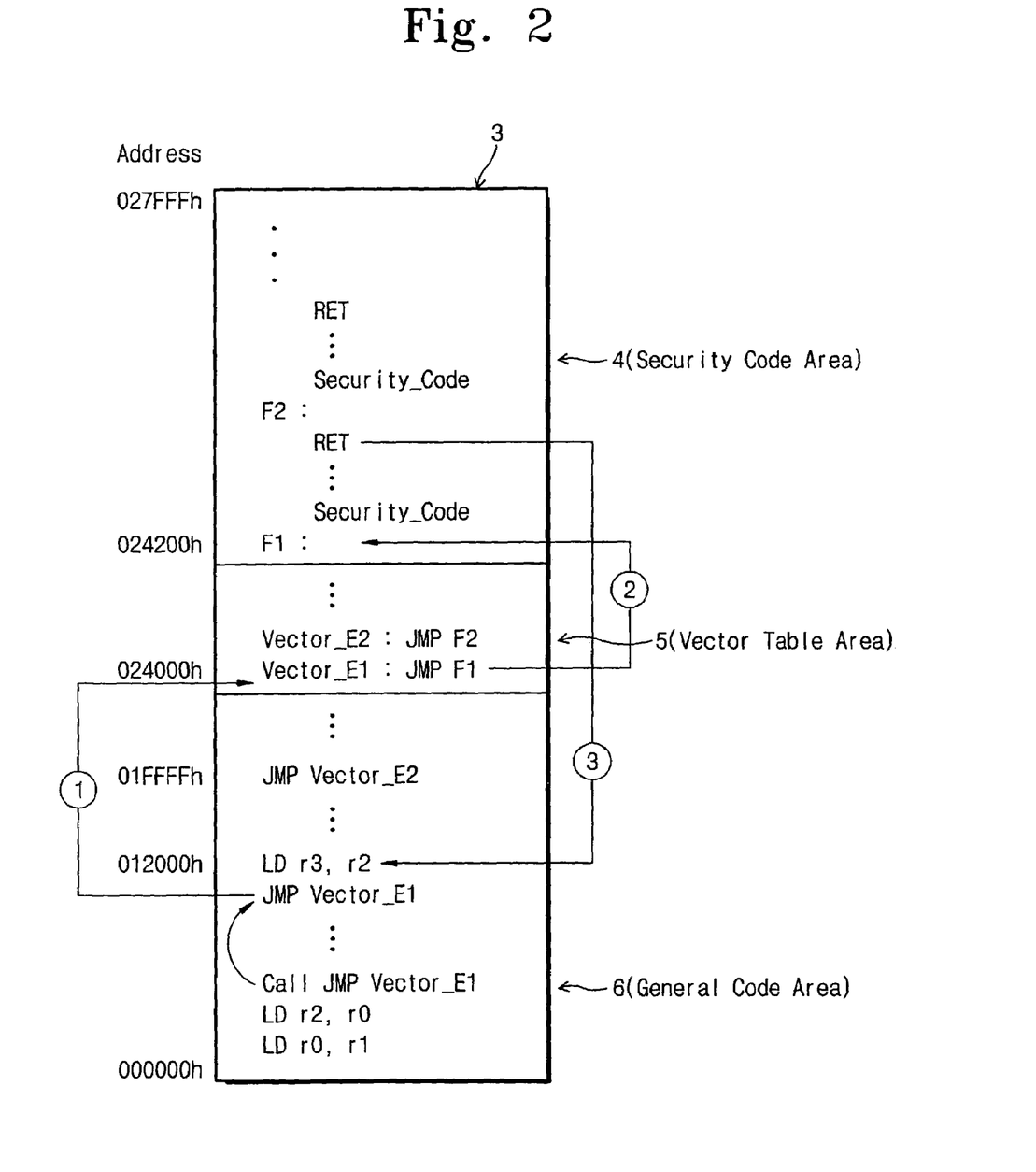
FIG. 2 is a view showing an architecture of a program memory of FIG. 1 in accordance with embodiments of the present invention.
Figure 4:
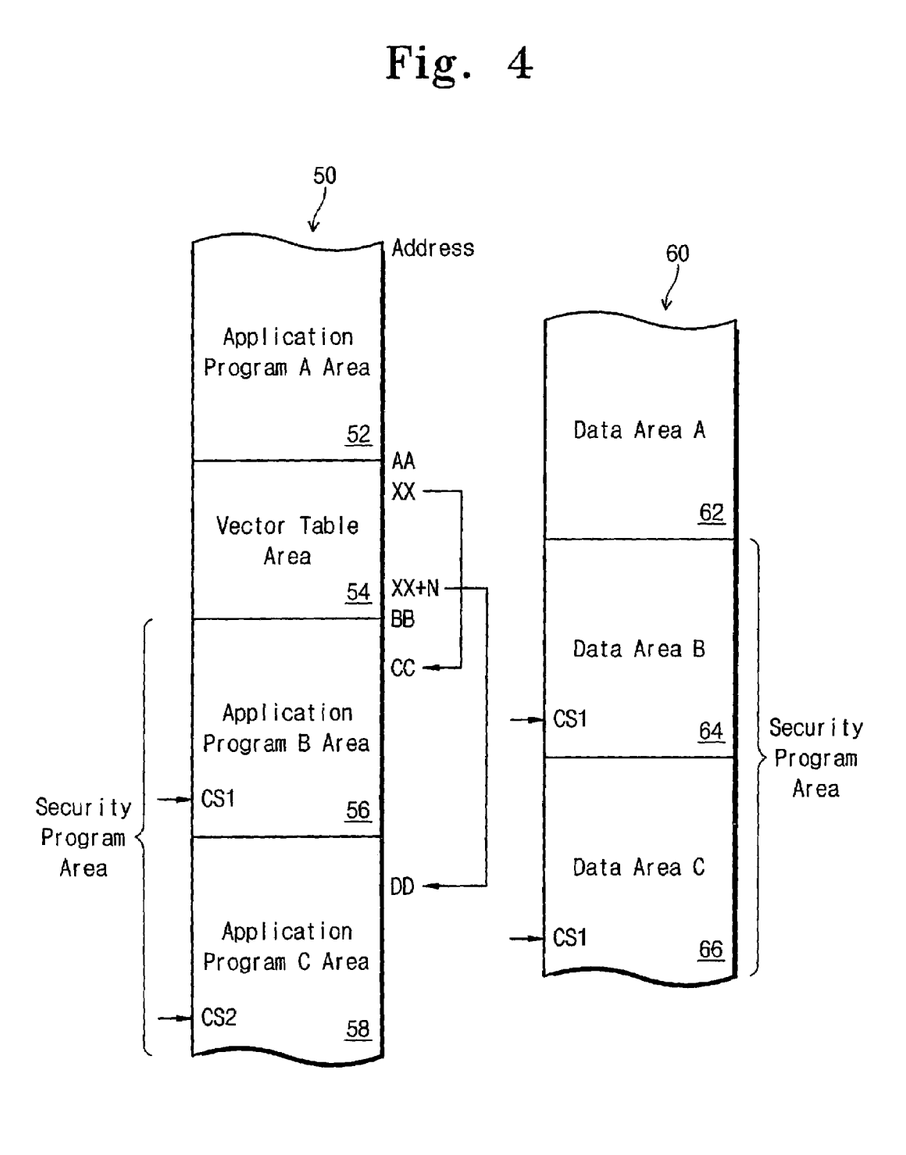
FIG. 4 is a schematic view of an architecture of a program memory and data memory in accordance with other embodiments of the present invention, in which multiple application programs are stored in the program memory.

FIGS. 2 and 4 are memory architectures that may be used with computer systems of FIGS. 1 and 3, respectively, according to embodiments of the present invention. These memory architectures may be used with any computer system as described above. However, because these memory architectures may have particular utility with smart cards, they are described below in connection with smart cards.

Referring to FIG. 1, a computer system, such as a smart card, according to embodiments of the present invention includes an input/output (I/O) terminal 1, a microprocessor or a central processing unit (CPU) 2, a program memory 3, a data memory 7, and a security program activation unit 10. The program memory 3 is a memory such as a Read Only Memory (ROM) in which a Card Operating System (COS) for operating a smart card chip is programmed. The CPU 2 controls internal paths used to access all the elements of the chip, such as the data memory 7, the program memory 3, Random Access Memory (RAM) (not shown), etc. The data memory 7 includes a security data area 8 and a general data area 9. The security data area 8 is a user data area which is protected from an external access by the CPU 2 and the card operating system, and may be embodied as an Electrically Erasable Programmable ROM (EEPROM) which can electrically read/write data. The security data area 8 includes a data set and functions realizable in various applications, in which the data set contains an operation, card issuer data, user data, etc.

As shown in FIG. 1, the program memory 3 includes a general code area 6, also referred to herein as a general application program area or a first memory area, a security code area 4, also referred to herein as a security application program area or a third memory area, and a vector table area 5, also referred to herein as a second memory area. The vector table area 5 includes function subroutine calls, also referred to as jump codes, which are special codes that jump to the security code area 4. In some embodiments, these areas can be divided so as to dispose them at physically different positions in one memory, can be interleaved in discontinuous memory areas and/or can be implemented in different memory devices.

The security program activation unit 10 enables/disables a select signal, also referred to as a chip select signal CS, so as to permit/deny an access to the security code area 4 and the security data area 8 (also referred to herein as a fifth memory area). The security program activation unit 10 includes an address decoder logic circuit 11 and a latch logic circuit 12 connected to the address decoder logic circuit 11.

All the memory areas 4, 5, 6, 8 and 9 are connected to the CPU 2 via an address bus 13. Although not shown, a data bus is further provided so as to exchange data. The address bus also can be used as the data bus. The address decoder logic circuit 11 of the security program activation unit 10 is connected to the address bus 13 so as to decode a corresponding address (the address of current executed program code, also referred to as a program counter) of the program memory 3, which is applied on the address bus 13. The latch logic circuit 12 applies its output signal to the security code area 4 and the security data area 8 in response to an output signal (set or reset signal) of the address decoder logic circuit 11. The output signal of the latch logic circuit 12 acts as the chip select signal CS used to enable or disable the security code area 4 and the security data area 8.

Hereinafter, security program operation in accordance with embodiments of the present invention will be described. In accordance with embodiments of the present invention, the security program activation unit 10 activates the security code area 4 and the security data area 8 only when the program counter changes to a specific value while the program is being executed in the program memory 3.

A user operating system program (general program) is executed in the general code area 6 under control of the CPU 2. At this time, since the address (program counter) of the program code executed is not an address value of the vector table area 5, the security program activation unit 10 does not activate the security code area 4 and the security data area 8. In other words, they are locked. If the general program is continuously executed so that the program counter changes to an address value in the vector table area 5, the address decoder logic circuit 11 of the security program activation unit 10 decodes the program counter and generates a set signal. The latch logic circuit 12 is set in response to the set signal generated from the address decoder logic circuit 11 so that the chip select signal CS for activating the security code area 4 and the security data area 8 is enabled or unlocked. Here, since the vector table area 5 includes the codes which jump to the security code area 4, the program is executed in the security code area 4. Accordingly, security information of the security data area 8 can be processed.

The smart card according to embodiments of the present invention can further include an encryption-dedicated processor 15 for controlling the security program. In these embodiments, the encryption-dedicated processor 15 is activated by the security program activation unit 10. It also will be understood that the I/O terminal 1, CPU 2, security program activation unit 10, encryption dedicated processor 15, subcombinations thereof and/or other elements not shown in FIG. 1, can provide a processing system of a computer system and/or means for providing computer processing functions according to embodiments of the present invention.

After completing the processing of the security information, the security program is ended. Then, if the program counter again changes to a value corresponding to the address of the general code area 6, the address decoder logic circuit 11 of the security program activation unit 10 decodes the address value to generate a reset signal. The latch logic circuit 12 is thereby reset so that the chip select signal CS becomes disabled. As a result, the security data area 8 and the security code area 4 are deactivated (locked) so that they are not accessible.

FIG. 2 is a view showing an architecture of the program memory 3 of FIG. 1 in accordance with embodiments of the present invention. Referring to FIG. 2, as described above, the program memory 3 of the smart card includes the general code area 6, the vector table area 5 and the security code area 4. The respective areas have a predetermined address range. For example, the general code area 6 has program memory addresses ranging from 000000h (hexadecimal) to 023FFFh, and the vector table area 5 has program memory addresses ranging from 024000h to 0241FFh. The security code area 4 has program memory addresses ranging from 024200h to 027FFFh. These memory addresses and sizes are illustrated as an example, so as to clearly explain the present invention and, therefore, they can be modified to provide other contiguous and/or noncontiguous addresses.

The vector table area 5 in accordance with embodiments of the present invention includes codes (function jump codes or subroutine calls) which jump to a specific portion of the security code area 4. For example, there are two function jump codes, i.e., Vector_E1:JMP F1 and Vector_E2:JMP F2. The security code area 4 includes security function codes, such as security function codes F1 and F2, to which the function jump codes of the vector table area 5 Vector_E1: JMP F1 and Vector_E2:JMP F2 jump (call). The general code area 6 includes general code for processing general information and vector jump codes, such as JMP Vector_E1 and JMP Vector_E2, for jumping to the function jump codes Vector_E1 and Vector_E2 of the vector table area 5. For example, the general code includes three load command codes LD r0, r1, LD r2, r0 and LD r3, r2. Alternatively, the general code area 6 can further include a call vector jump code Call JMP Vector_E1 for calling a vector jump code, e.g., JMP Vector_E1. As a result, the general code area can move to the security code area by a subroutine call (jump).

Referring again to FIG. 1, as is well known, the CPU 2 may be divided into a control unit (not shown) and a data path or an execution unit (not shown). The control unit can include a program counter and an instruction register. The program counter contains a program memory address for fetching the next instruction to be executed, and the instruction register is a register for storing an instruction fetched by the program counter. The path can include an arithmetic logic unit and an accumulator. In addition, the control unit can include a memory address register for holding a program memory address during a memory access. The data path also includes a memory buffer register for decoupling a memory from the internal operation of the CPU.

It is assumed that the CPU 2 is initialized and the control unit of the CPU 2 is reset. At this time, the program counter of the control unit is also reset to a predetermined value, e.g., @. The program memory address for fetching the next command is stored in the program counter and then moves to the memory address register. Then, the control unit starts a memory read operation using the address bus 13. The instruction set is read out from the program memory 3 via the instruction path and stored into the instruction register. Sequentially, the command set, e.g., the load command LD r0, r1, stored in the instruction register is analyzed and the data stored in the data memory (general information area 9) is read out. The data stored in the data memory is stored into the memory buffer register and stored into the register r0 and r1. Through these operations, the load operation is ended. Finally, the program memory address value is incremented to @+1. The program memory address value (@+1) designated by the program counter moves to the memory address register. The program memory read operation starts again so that the instruction set is stored into the instruction register. Then, the command, e.g., LD r2, r0, stored in the instruction register is analyzed and the value stored in the data memory (general information area 9) is stored into the register r2 and r0, to complete the load operation. Finally, the program counter is again incremented from @+1 to @+2. In the above manner, the program is continuously executed and a value of the program counter is incremented to @+n).

Then, the instruction set, e.g., JMP Vector E1, is fetched from the program memory 3 and stored in the instruction register. The instruction JMP Vector E1 stored in the instruction register is analyzed. Because the fetched instruction is the jump command, a value of the program counter is replaced with an address value (one of addresses 02400h to 0241FFh of the vector table area of the memory area in which the Vector E1 is stored, for example, a value labeled as Vector_E1:024000h in FIG. 2). The address value of the vector table area 5 moves to the memory address register and is applied on the address bus 13. The address decoder logic 11 of the security program activation unit 10 connected to the address bus 13 decodes the address value 024000h of the vector table area to generate the set signal. The latch logic 12 is set in response to the set signal so that the chip select signal CS to the security code area 4 and the security information area 8 is enabled (unlocked), thereby activating the security program.

Meanwhile, the instruction set (e.g., function jump code (JMP F1) existing at the address value 024000h labeled as Vector_E1 stored in the program counter is again stored into the instruction register and analyzed by the control unit. As described above, all the instruction sets of the vector table area 5 include the instruction sets jumping to the security code area 4. Accordingly, the program counter becomes one of the addresses of the security code area 4 (e.g., in FIG. 2, address 0242000h of the security function code labeled as F1). Therefore, the security program is executed in the security code area. In other words, the security function code F1 is executed. It may be desirable that the security function code F1 should start with a security code for checking whether or not a user is authorized. For example, the security code can be an RSA_Sign function. The following known operation routines can be executed within the function:

RSA(input, output)
    {check security condition,
    key load
    data load
    RSA Sign operation
    Store result
    Return}

After the authorized user certification, the security information of the security data area 8 may be manipulated. After completing the manipulation of the security information, the program counter is again changed to the address value of the general code area 6 by the result code or a return code (RET). For example, if there is a command LD r3, r2, the program counter is changed to an address 012000h of the general code area.

If the program memory address 012000h stored in the program counter is applied on the address bus 13 via the memory address register, the address decoder logic circuit 11 of the security program activation unit 10 again decodes the program memory address to generate the reset signal. The latch logic circuit 12 is reset in response to the reset signal so that the chip select signal CS to the security code area 4 and the security data area 8 is disabled (locked). As a result, the security program cannot be accessed. Then, the instruction set LD r3, r2 existing on the program memory address designating the program counter is fetched and the fetched instruction set is analyzed and executed.

The program is continuously executed in the general code area 6 and the command (e.g., JMP Vector_E2) existing on the program memory address 01FFFFh and again jumping to the vector table area 5 is fetched. Because the fetched command is the jump command, the program counter is changed to the address value of the vector table area 5 in which the JMP Vector_E2 exists, and the security code area 4 and the security data area 8 are again activated (unlocked) by the security program activation unit 10. Simultaneously, the execution of the jump command set JMP F2 of the vector table area 5 causes the program to move to the security code area 4. Therefore, the security program is executed in the security code area 4 and the security function code F2 is executed.

As described above, in accordance with embodiments of the present invention, the security program is executed only through a predetermined path, i.e., the subroutine function call (jump). In other words, the vector jump code JMP Vector_E1 is executed in the general code area 6 and, thus, the program jumps to the function jump code Vector_E1 of the vector table area 5. Then, the JMP F1 is executed and finally the program jumps to the security code area 4 so that the security function code F1 is executed. At this time, if the jump command for jumping to the vector table area by the vector jump code is executed and the program counter is changed to the address value of the vector table area 5 in which the vector jump code is stored, the security program activation unit 10 decodes the program counter to activate the security code area 4 and the security information area 8. Therefore, the security code area and the security data area may not be accessed by using a direct jump or load command in the general code area.

In embodiments of the present invention, the chip select signal for activating the security program is enabled by the subroutine function call (jump) and a value of a specific program counter or address on the address bus. Accordingly, based on the chip select signal, it is possible to implement various embodiments. For example, in the above embodiments, when the program counter or address bus is changed to the address value of the vector table area, the chip select signal with respect to the security code area is enabled. Then, when the value of the program counter or address bus is changed to the address value of the security code area by the subroutine function jump, the chip select signal to the security data area can be enabled.

Hereinafter, other embodiments of the present invention will be described with reference to FIG. 3. The same reference numerals as FIG. 2 are used in elements of FIG. 3 which are the same as FIG. 2, and a detailed description about those elements will be omitted. In FIG. 3, in order to transmit data between the CPU 2 and the memory devices 4, 5, 6, 8 and 9, all the memory areas are connected to a data bus (not shown). In order to interface between the CPU 2 and the memory devices 4, 5, 6, 8 and 9, all the memory areas are connected via the CPU 2 and the address bus. In FIG. 3, the reference symbol A represents the address bus. The general code area 6 is an area having logic addresses ranging from 00000h to 0FEFFh, and the vector table area 5 is an area having addresses ranging from 0FF00h to 0FFFFh. The security code area 4 is an area having addresses ranging from 10000h to 1FFFFh. The general code area 6 and the security code area 4 are divided by making their most significant address bits complementary to each other, i.e., by making them logically complementary states to each other.

Referring to FIG. 3, the general data area 9, the security data area 8, the general code area 6 and the security code area 4 are activated (unlocked) or deactivated (locked) by a logical product of two chip select signals CS1 and CS2. In addition, only the chip select signals CS2 (second chip select signals) applied to the security data area 8 and the security code area 4 are enabled/disabled by the address decoder logic circuit 11 of the security program activation unit 10. Further, among the code addresses of the program being executed, the most significant bit is applied to the general code area 6 and the security code area 4 to thereby operate as other chip select signals (first chip select signals), and inverted and applied to the general code area 6.

Specifically, in the illustrated embodiments of the present invention, the first chip select signals CS1 are applied to the security code area 4 and the general code area 6 according to the most significant bit (MSB) Address bit16 of the program memory addresses. In other words, for the general code area 6, logic state of the address applied on the address bus A is inverted and the inverted logic state operates as the first chip select signal CS1. For the security code area 4, the logic state of the most significant bit operates as the first chip select signals CS1. The most significant bit of "0" is a logic low state and the most significant bit of "1" is a logic high state. The first chip select signals CS1 applied to the general data area 9 and the security data area 8 are set to a logic "1", i.e., a logic high state. In addition, the second chip select signals CS2 applied to the general data area 9 and the general code area 6 are also set to a logic "1", i.e., a logic high state. When the code address (the value of the program counter) applied on the address bus A becomes the address value of the vector table area 5, i.e., in FIG. 3, if the most significant bit (Address bit16) of the memory address is "0" and the eighth to fifteenth bits (Address bit15 to Address bit8) are "1", the address decoder logic 11 of the security program activation unit 10 generates the set signal so that the latch logic circuit 12 is set. Therefore, the second chip select signals CS2 applied to the security data area 8 and the security code area 4 are enabled.

Specifically, it is assumed that the general program is executed in the general code area 6 under a control of the CPU 2. Because the general code area 6 occupies an area having logic addresses ranging from 00000h to 0FFFFFh, the most significant bit of the program memory address is a logic "0". Accordingly, because the inverted logic "1" operates as the chip select signal CS1, the first chip select signal CS is in the enabled state. Meanwhile, because the second chip select signal CS2 of the general code area 6 is in the enabled state, the general code area 6 becomes unlocked by a logical product of the two chip select signals.

However, in the security code area 4, because the most significant bit's logic "0" itself of the program memory address operates as the first chip select signal CS1, the first chip select signal CS1 becomes disabled (locked). In addition, because the program memory address is not the value of the vector table area, the address decoder logic circuit 11 decodes the program memory address to generate the reset signal. The latch logic circuit 12 is reset in response to the reset signal so that the second chip select signal applied to the security code area 4 and the security data area 8 become disabled (locked). As a result, the security code area 4 and the security data area 8 are not activated. When the general program is being executed, the security code area 4 and the security data area 8 are in the deactivated state so that they may not be accessed.

If the general program is progressed and the program counter is changed to the address value (one of the addresses ranging from 0FF00h to 0FFFFh) of the vector table area 5 by the subroutine function call (jump), the corresponding address is applied on the address bus A. Therefore, the second chip select signals CS2 applied to the security code area 4 and the security data area 8 are enabled by the address decoder logic circuit 11 of the security program activation unit 10. Meanwhile, because the vector table area 5 includes the jump codes jumping to the vector table area 5 and the security code area 5, the program memory address is changed to the address of the security code area 4. Because the most significant bit of the program memory address value of the security code area 4 is a logic "1", the chip select signal CS1 applied to the security code area 4 is the enabled state. However, in case of the general code area 6, the most significant bit is inverted, the chip select signal applied to the general code area 6 is in the disabled state. As a result, the subroutine function call is performed, and the general code area is deactivated when the program is executed in the security code area 4.

After the execution of the security program is ended, if the program counter is again changed to the program memory address, the second chip select signal CS2 applied to the security code area 4 and the security data area 8 and the first chip select signal CS1 applied to the security code area 4 are disabled. Therefore, the security code area and the security data area are deactivated so that they may not be accessed. Meanwhile, the second chip select signal CS2 applied to the general code area 6 is in the enabled state. In addition, since the most significant bit of the program memory address of the general code area 6 is a logic "0", the first chip select signal CS1 applied to the general code area 6 is in the enabled state. As a result, the general code area 6 is activated so that the general program is executed.

In some embodiments of the present invention, the second chip select signal CS2 applied to the second data area 8 is always in a logic high level. However, according to other embodiments of the present invention, the most significant bit of the program memory address can be applied in the same manner as the security code area 4.

Further, in the above embodiments of the present invention, in the general data area 9, the chip select signals CS1 and CS2 are always in the enabled state. However, the inverted most significant bit of the program memory address is also applicable to the first chip select signal CS1 of the general data area 9 in the same manner as the general code area 6. In this case, the general data area 9 is not always in the enabled state and becomes the enabled state only when the general program is executed.

In other embodiments of the present invention, the chip select signals can be enabled/disabled using two or more most significant bits of the program memory address. Therefore, various application programs having different security grades from each other can be installed in a single chip. Further, the security code area desiring a security of the vector table area's jump can be diversified.

FIG. 4 is a view explaining the above-described embodiments and shows a program memory 50 and a corresponding data memory 60, in which multiple application programs are stored in the program memory 50.

The program memory 50 includes an application program A area 52, an application program B area 56, an application program C area 58 and a vector table area 54. The application programs B and C areas 56 and 58 are a security program area and access to them is denied during the execution of the application program A. The data memory 60 includes a data area A 62 corresponding to the application program A, a data area B 64 corresponding to the application program B, and a data area C 66 corresponding to the application program C, and the data areas B and C 64 and 66 are a security data area.

The jump codes jumping to the application programs B and C 56 and 58 are stored in the vector table area 54, and the vector table area 54 is an area having addresses ranging from AA to BB. For example, as shown, a jump command for jumping to address CC of the application program B area 56 exists in memory address XX of the vector table area 54. In addition, a jump command for jumping to address DD of the application program B area 56 exists in memory address XX+N of the vector table area 54.

The respective areas of the program memory or the respective areas of the data memory can be divided so that they can be physically disposed at different positions in one memory, they can be interleaved and/or they can be implemented with different memory devices from each other.

While the application A (general program) is being executed in the application program A area 52 by the CPU, if the value of the program counter is changed to the address XX of the vector table area 54 (by the execution of the jump command for jumping to the address XX), the chip select signal CS1 is enabled so that the application program B and the data area B 64 are activated. In the same manner, if the value of the program counter is changed to the address XX+N of the vector table area 54 (by the execution of the jump command for jumping to the address XX+N), the chip select signal CS2 is enabled so that the application program C and the data area C 66 are activated. Therefore, direct access from the application program A to the application program B or C may be prevented.

Although embodiments of smart cards were described above, the scope and spirit of the present invention is not limited to smart cards and is applicable to various computer systems which process data.

In accordance with some embodiments of the present invention, a security program permits the access to the security code area and the security data area only when the value of the program counter is changed to specific program memory address value by the subroutine call (jump). Accordingly, the security program can be completely separated from the general program. In other words, the general program may not be processed by directly accessing to the security information. That is possible by activating the security program via a predetermined specific path.

Accordingly, in some embodiments, the security information can be protected since the security information and the security device can be completely separated from the general application program. Further, the security information and the security device can be installed in the same chip having application programs with different security grades from each other by allowing the security information and the security equipment to act as a service provider.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A computer system comprising:

first, second and third memory areas, the first memory area storing therein at least one general application program including at least one subroutine call to the second memory area, the second memory area storing therein at least one subroutine call to the third memory area, and the third memory area storing therein at least one security application program that is callable by a subroutine call from the second memory area; and a processing system that is configured to execute a general application program in the first memory area including a subroutine call to the second memory area and to unlock the third memory area upon executing the subroutine call from the first memory area to the second memory area to allow the general application program in the first memory area to indirectly access the security program in the third memory area via the subroutine call to the second memory area but prevent the general application program stored in the first memory area from directly accessing the security application program stored in the third memory area, wherein the processing system includes an address bus that transmits an address of a memory location that is being accessed, and wherein the processing system is configured to unlock the third memory area when the address bus transmits an address of a memory location in the second memory area and is configured to lock the third memory area when the address bus transmits an address of a memory location in the first memory area.

2. A computer system according to claim 1 wherein the processing system is further configured to prevent unlocking of the third memory area while executing a general application program in the first memory area.

3. A computer system according to claim 1 wherein the processing system includes an address decoder logic that is configured to produce a set signal in response to an address that is transmitted on the address bus being located in the second memory area, and a latch that is responsive to the set signal to activate a select signal for the third memory area.

4. A computer system according to claim 3, wherein the address decoder logic is further configured to produce a reset signal in response to an address that is transmitted on the address bus being located in the first memory area, the latch being responsive to the reset signal to deactivate the select signal for the third memory area.

5. A computer system according to claim 1 wherein the most significant address bit of the first memory area and the third memory area are complementary to one another and wherein the most significant address bit on the address bus is applied to the third memory area and is applied to the first memory area in inverted form such that the third memory area is activated by a combination of the select signal and the most significant bit of the address bus.

6. A computer system according to claim 1 further comprising a fourth memory area that stores therein data that is processed by the at least one general application program in the first memory area and a fifth memory area that stores therein data that is processed by the at least one security application program in the third memory area, the processing system further configured to unlock the fifth memory area only upon executing the subroutine call from the first memory area to the second memory area.

7. A computer system according to claim 6 wherein the processing system is further configured to prevent unlocking of the fifth memory area while executing a general application program in the first memory area.

8. A computer system according to claim 1 wherein at least one of the security application programs comprises a user authentication program.

9. A computer system according to claim 1 wherein the first, second and third memory areas and the processing system are all contained in a smart card.

10. A computer system according to claim 1 wherein the first memory area is a general code area, the second memory area is a vector table area and the third memory area is a security code area.

11. A computer system according to claim 1 wherein the processing system is further configured to maintain the third memory area unlocked while executing a security application program in the third memory area.

12. A computer system according to claim 11 wherein the processing system is further configured to lock the third memory area upon executing a subroutine call from the third memory area to the first memory area.

13. A memory architecture for a computer system comprising:
- first, second and third memory areas, the first memory area storing therein at least one general application program including a plurality of subroutine calls to the second memory area, the second memory area storing therein a plurality of subroutine calls to the third memory area, and the third memory area storing therein a plurality of security application programs that are callable by a subroutine call from the second memory area,
- wherein the third memory area is configured to be unlocked upon execution of a subroutine call from the first memory area to the second memory area to allow a general application program in the first memory area to indirectly access a security program in the third memory area via the subroutine call to the second memory area but prevent the general application program stored in the first memory area from directly accessing the security application program stored in the third memory area.
- wherein the third memory area is configured to be unlocked when an address bus transmits an address of a memory location in the second memory area and is configured to be locked when the address bus transmits an address of a memory location in the first memory area.

14. A memory architecture according to claim 13 further comprising a fourth memory area that stores therein data that is processed by the at least one general application program in the first memory area and a fifth memory area that stores therein data that is processed by the security application programs in the third memory area.

15. A memory architecture according to claim 13 wherein at least one of the security application programs comprises a user authentication program.

16. A memory architecture according to claim 13 wherein the most significant address bit of the first memory area and the third memory area are complementary to one another.

17. A memory architecture according to claim 13 wherein the first, second and third memory areas are all contained in a smart card.

18. A memory architecture according to claim 13 wherein the first memory area is a general code area, the second memory area is a vector table area and the third memory area is a security code area.

19. A computer system comprising:
- first, second and third memory areas, the first memory area storing therein at least one general application program including at least one subroutine call to the second memory area, the second memory area storing therein at least one subroutine call to the third memory area, and the third memory area storing therein at least one security application program that is callable by a subroutine call from the second memory area;
- means for executing a general application program in the first memory area including a subroutine call to the second memory area, wherein the means for executing comprises means for transmitting an address of a memory location that is being accessed;
- means for unlocking the third memory area only upon executing a subroutine call from the first memory area to the second memory area to allow the general application program in the first memory area to indirectly access the security program in the third memory area via the subroutine call to the second memory area but prevent the general application program stored in the first memory area from directly accessing the security application program stored in the third memory area, wherein the means for unlocking comprises means for unlocking the third memory area when the means for transmitting transmits an address of a memory location in the second memory area; and
- means for locking the third memory area when the means for transmitting transmits an address of a memory location in the first memory area.

20. A computer system according to claim 19 further comprising:
- means for preventing unlocking of the third memory area while executing a general application program in the first memory area.

21. A computer system according to claim 19 further comprising:
- a fourth memory area that stores therein data that is processed by the at least one general application program in the first memory area;
- a fifth memory area that stores therein data that is processed by the at least one security application program in the third memory area; and
- means for unlocking the fifth memory area upon executing a subroutine call from the first memory area to the second memory area.

22. A computer system according to claim 21 further comprising means for preventing unlocking of the fifth memory area while executing a general application program in the first memory area.

23. A computer system according to claim 19 wherein the first, second and third memory areas, the means for executing and the means for unlocking are all contained in a smart card.

24. A computer system according to claim 19 further comprising means for maintaining the third memory area unlocked while executing a security application program in the third memory area.

25. A computer system according to claim 24 further comprising means for locking the third memory area upon executing a subroutine call from the third memory area to the first memory area.

26. A method of executing a security program embodied in a computer usable storage medium while executing an application program embodied in a computer usable storage medium, the method comprising:
executing the application program;
transmitting an address of a memory location that is being accessed responsive to executing the application program on an address bus;
locking the security program when the address of the memory location does not correspond to a vector table area containing therein at least one subroutine call to the security program to prevent direct access thereto;
unlocking the security program upon execution of a subroutine call to the vector table area and when the address of the memory location corresponds to the vector table area to allow indirect access thereto via the subroutine call; and
executing the security program that is unlocked to access a data area associated with the security program.

27. A method according to claim 26 further comprising locking the security program upon executing a subroutine call back to the application program.

28. A method according to claim 26 wherein the executing an application program, unlocking the security program and executing the security program are all performed in a smart card.

29. A method according to claim 26 wherein the unlocking comprises maintaining the security program unlocked while executing the security program.

* * * * *

UNITED STATES PATENT AND TRADEMARK OFFICE
CERTIFICATE OF CORRECTION

PATENT NO. : 7,353,403 B2  Page 1 of 1
APPLICATION NO. : 10/424654
DATED : April 1, 2008
INVENTOR(S) : Kim It is certified that error appears in the above-identified patent and that said Letters Patent is hereby corrected as shown below:

Column 13, Claim 13, Line 48: Please correct "area."
                                      To read -- area, --

Signed and Sealed this

Eighth Day of July, 2008

JON W. DUDAS
*Director of the United States Patent and Trademark Office*